June 9, 1953  J. R. OISHEI  2,641,305
SEAT FOR MOTOR VEHICLES
Filed Sept. 12, 1946  5 Sheets-Sheet 1
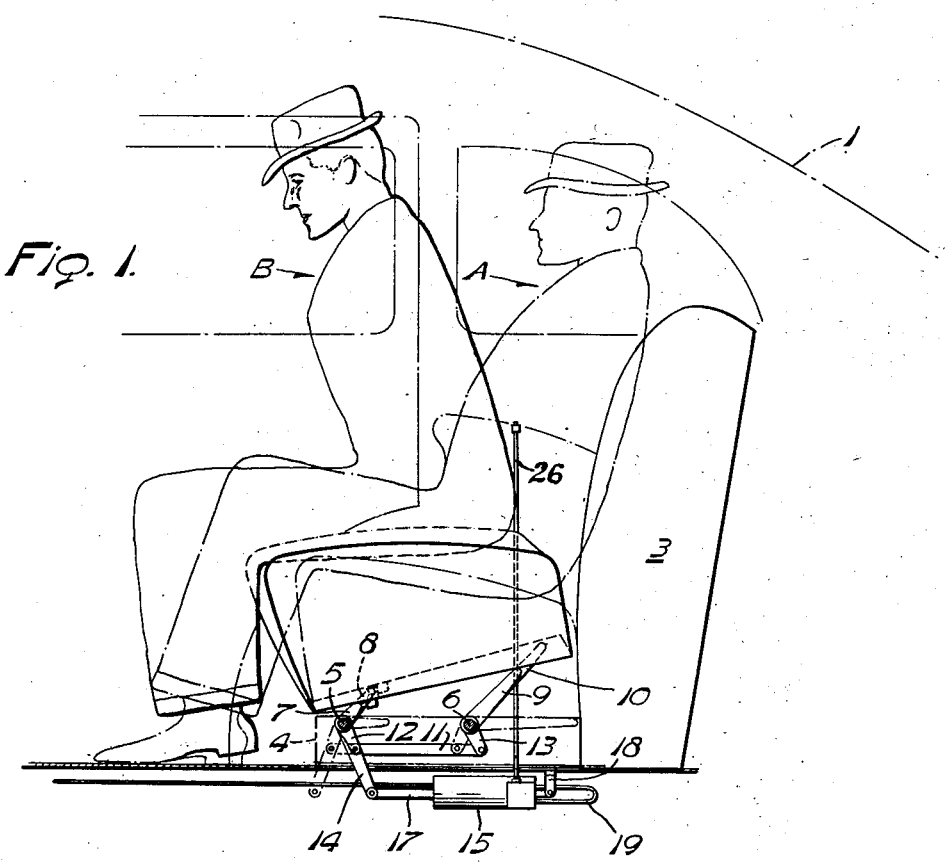
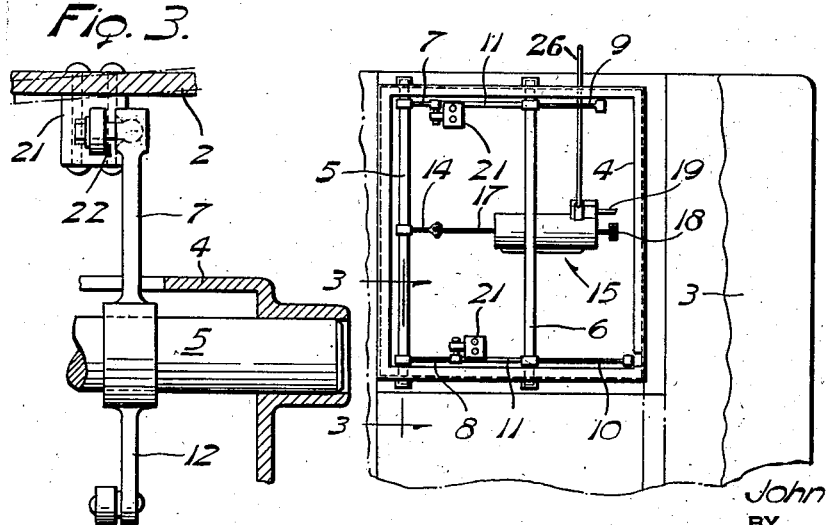
INVENTOR
John R. Oishei
BY
Bean, Brooks, Buckley & Bean.
ATTORNEYS

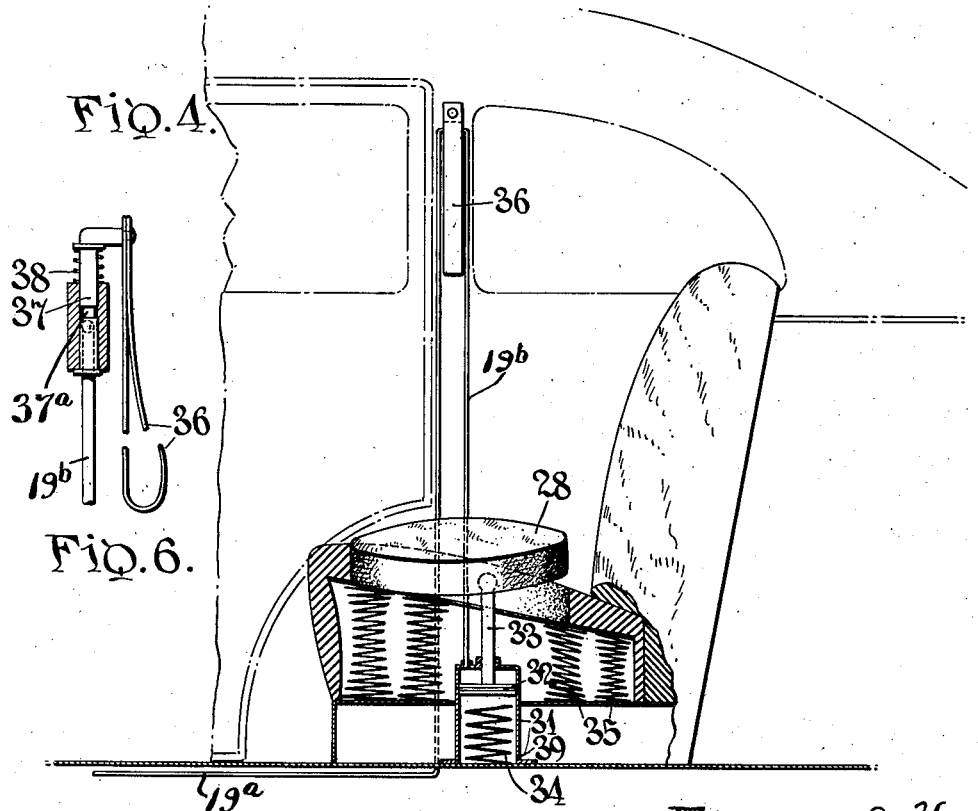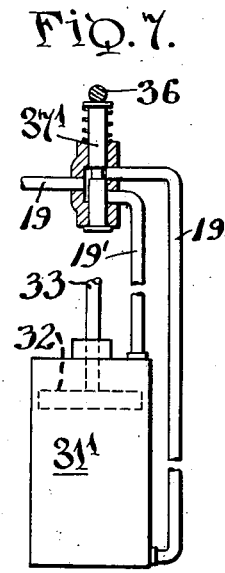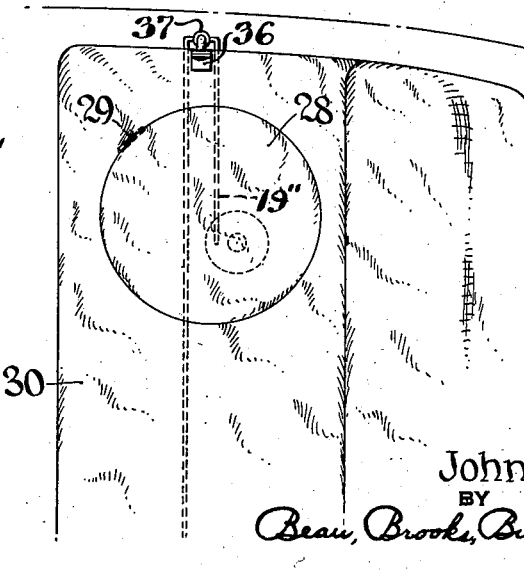

June 9, 1953 J. R. OISHEI 2,641,305
SEAT FOR MOTOR VEHICLES
Filed Sept. 12, 1946 5 Sheets-Sheet 3
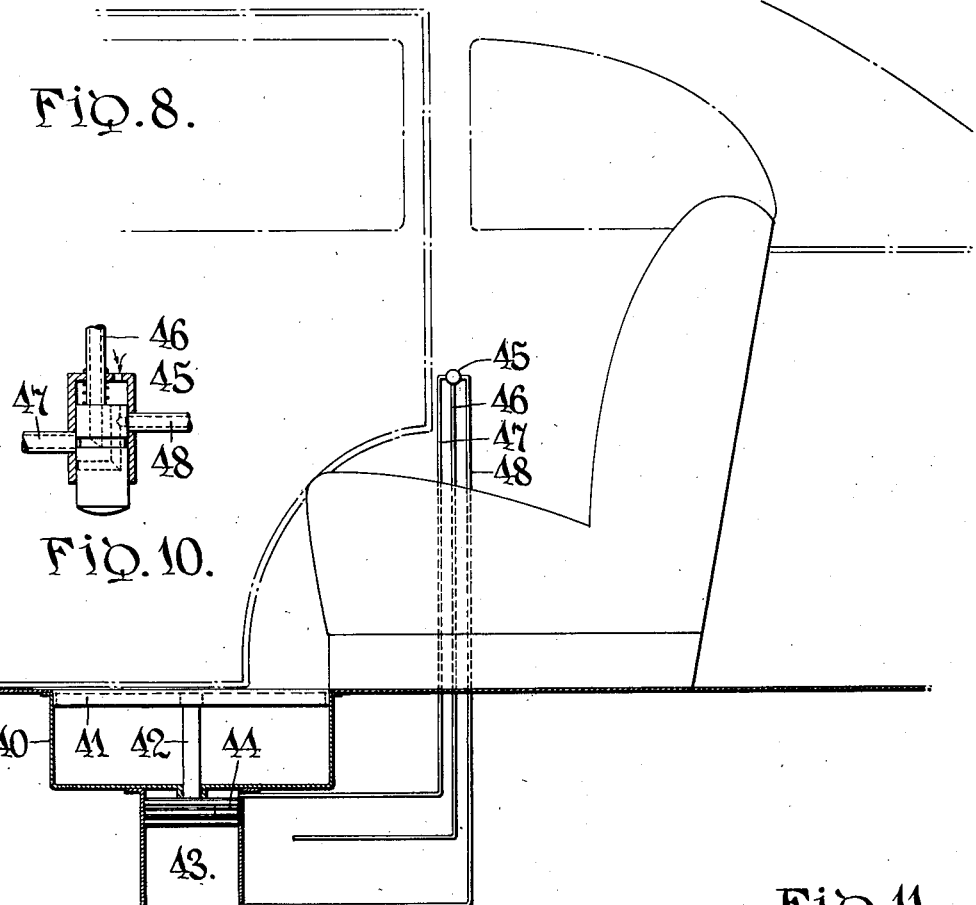
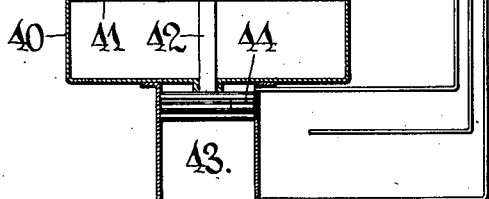
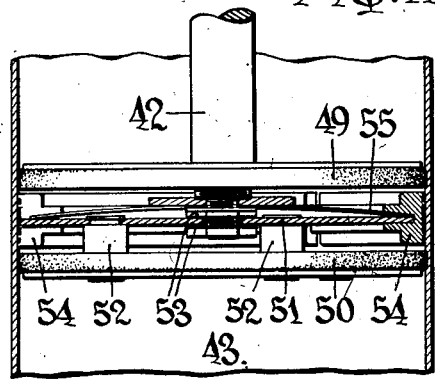
INVENTOR
John R. Oishei,
BY
Beau, Brooks, Buckley & Beau.
ATTORNEYS

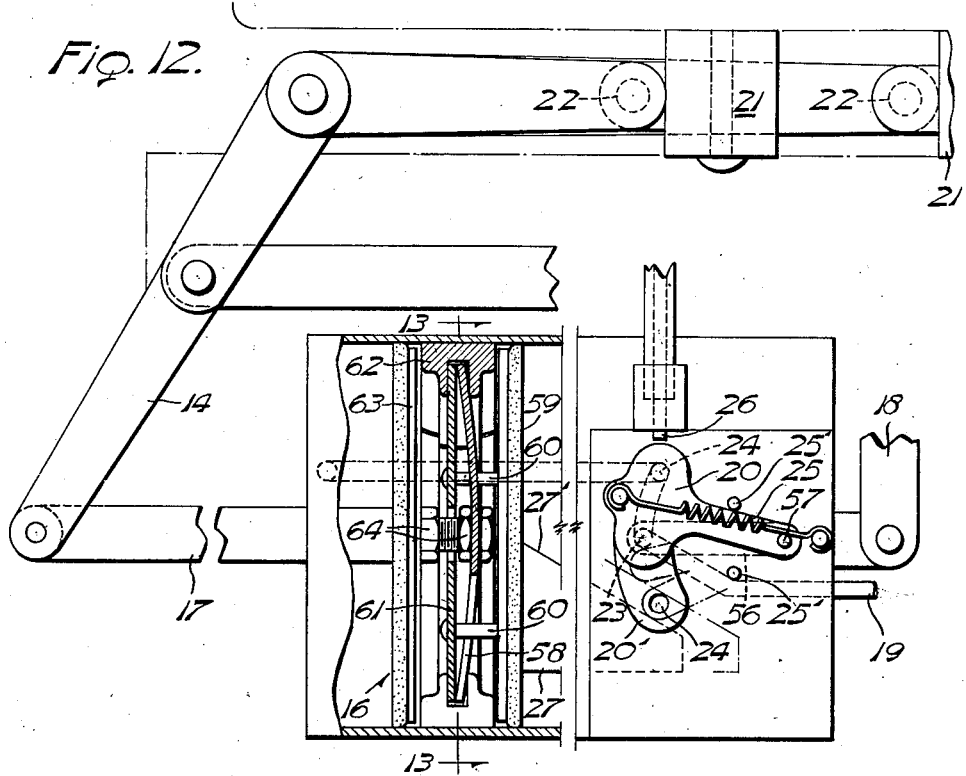
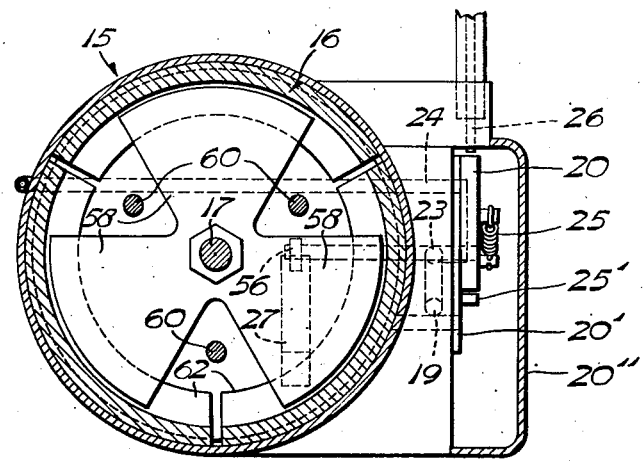

June 9, 1953    J. R. OISHEI    2,641,305
SEAT FOR MOTOR VEHICLES
Filed Sept. 12, 1946    5 Sheets-Sheet 5

INVENTOR
John R. Oishei
BY
Bean, Brooks, Buckley & Bean.
ATTORNEYS

Patented June 9, 1953

2,641,305

UNITED STATES PATENT OFFICE 2,641,305

SEAT FOR MOTOR VEHICLES

John R. Oishei, Buffalo, N. Y., assignor to
Trico Products Corporation, Buffalo, N. Y.

Application September 12, 1946, Serial No. 696,409

10 Claims. (Cl. 155—5)

This invention relates to a motor vehicle and primarily to a seating arrangement or construction for automobiles which will facilitate the occupant's rising more easily from the seats which are so deeply cushioned for riding comfort, this application being a continuation in part of my earlier application Serial Number 370,227 now abandoned.

In the present day motor vehicle the upholstered seats are designed for best riding quality with the forward edge of the seat slightly elevated and for this reason the occupant assumes a position from which it is difficult to quickly arise without maneuvering, sometimes with the aid of an assist cord or strap, to a position at the forward edge of the seat from which he may step from the car.

The primary object of the present invention is to provide a seat adjustable, under the control of the occupant, to a position from which he may alight from the car with comparative ease. More particularly, the invention comprehends the use of power means for assisting the occupant to readily leave the vehicle without the usual discomfiture entailed in trying to slide to the forward edge of the seat.

In the drawings

Fig. 1 is a fragmentary phantom view of a passenger automobile showing the present invention incorporated in the rear seat thereof;

Fig. 2 is a fragmentary plan view of the rear seat with a part removed to more clearly depict the seat adjusting mechanism;

Fig. 3 is a detailed sectional view of the seat mechanism about on line 3—3 of Fig. 2;

Fig. 4 is a view similar to Fig. 1 showing a modified form of the invention;

Fig. 5 is a top plan view of the modified seat;

Fig. 6 is a detailed sectional view of the control valve incorporated in the embodiment of Fig. 4;

Fig. 6a is a like sectional view taken through a vertical plane at right angles to the plane of section of Fig. 6;

Fig. 7 is a like view of a modified form of control for such seat;

Fig. 8 is a view similar to Figs. 1 and 4 showing a further embodiment of the inventive principles herein involved;

Fig. 9 is a bottom plan view of the floor adjustment of Fig. 8;

Fig. 10 is a detailed sectional view of the control valve or button utilized in the embodiment of Fig. 8;

Fig. 11 is a detailed view of the fluid motor which may be employed in the seat or floor mechanism;

Fig. 12 is a fragmentary view on an enlarged scale illustrating more particularly the construction of the motor illustrated in Figs. 1 and 2;

Fig. 13 is a transverse sectional view through the motor about on line 13—13 of Fig. 12;

Figure 14:
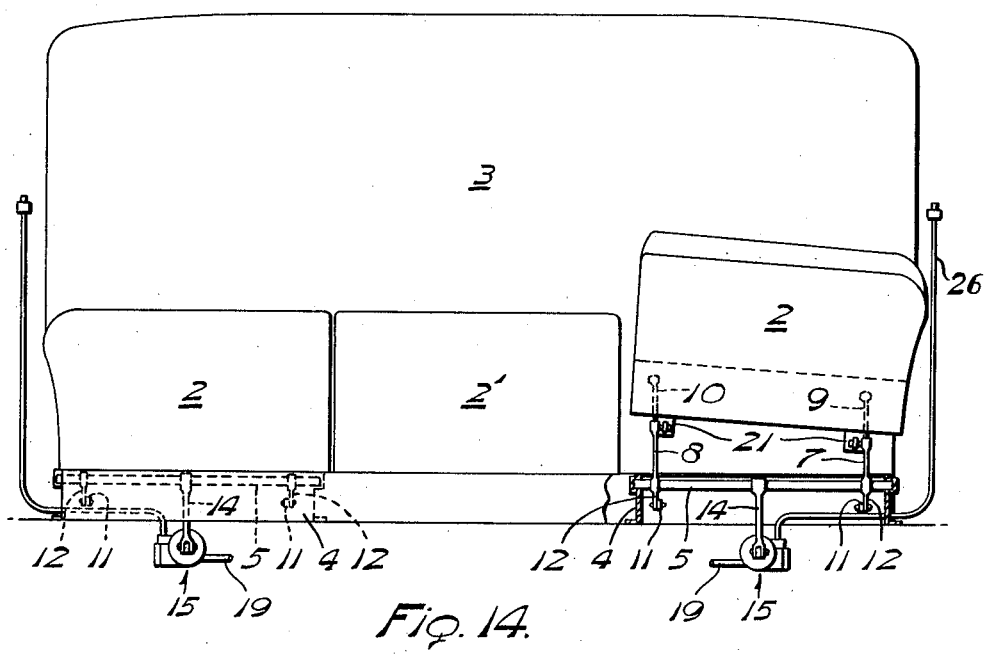
Fig. 14 is a front elevation of the seat depicted in Fig. 1.
Figure 15:
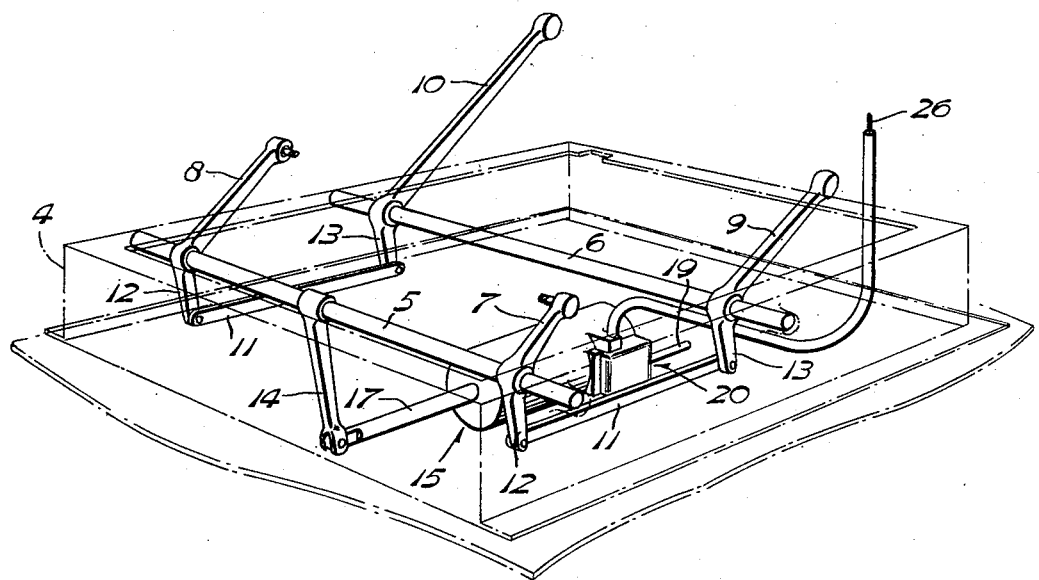
Fig. 15 is a detailed perspective of the seat supporting linkage.

Referring more particularly to the acompanying drawings, the numeral 1 designates a passenger vehicle having an upholstered cushion seat 2 with a back rest 3. The seat has its base resting upon a foundation part 4 upstanding from the floor of the automobile.

In accordance with the present invention means are provided to tilt or adjust the seat in a manner to shift the center of gravity of the occupant forwardly to a position from which he may readily rise to his feet. This is accomplished in the embodiments shown either by exerting a lifting or boosting effort on the seat, or by lowering the feet of the occupant to assume a semi-standing position.

In the embodiment depicted in Figs. 1 and 2, means are provided for tilting the seat forwardly, which means in the present illustration comprises a pair of rock shafts 5 and 6, the forward rock shaft having seat supporting and lifting arms 7 and 8, while the rearward shaft 6 is provided with relatively longer seat lifting arms 9 and 10. The two rock shafts are connected by drag links 11 joining two crank arms 12 and 13 on the respective shafts. One of the shafts, preferably the forward one, has a longer crank arm 14 for lever advantage connected to a source of power, such as a motor. The motor depicted comprises a cylinder 15 and a piston 16, the latter having a rod 17 pivotally connected to the crank arm 14. The motor may be given pivotal support on a bracket 18 to accommodate the swinging movement of the crank arm. As a convenient source of fluid pressure for operating the motor, the intake manifold of the vacuum internal combustion power plant may be utilized, being connected thereto by a conduit 19 in which is interposed a control valve 20. Normally this valve opens the source of suction to the left end of the cylinder chamber to hold the seat down and when the valve is depressed the suction will be transferred to the right end of the chamber to actuate the lift arms and elevate the seat after a rocking manner, thereby changing the position of the occupant from a normal sitting posture, indicated at A in Fig. 1, to the forwardly projected position B from which he may readily alight from the vehicle. In addition to rearranging his sitting posture, the occupant of the seat is also shifted forwardly which places him in a more central location with respect to the body of the vehicle where he will have more head room. This is advantageous in that the streamlined design of the modern car gives a pronounced slope to the rear of the vehicle which brings the ceiling quite low over the back of the seat.

To further assist the occupant in alighting from the vehicle the seat may be given an outward tilt toward the side entranceway to the automobile, and this may be accomplished by lengthening the inner lift arms 8 and 10 relative to the outer arms 7 and 9. By this arrangement the occupant is not only shifted forwardly to a position in which his knees assume an obtuse angle, approaching somewhat a semi-standing posture, but he is also given a lateral inclination and is therefore leaning in the direction of his exit. In a construction where the seat is given this compound tilting motion the seat may be divided into sections each designed for an individual occupant such as are shown in Fig. 14 with the central section 2' fixed and interposed between the movable end sections 2. To accommodate this movement the seat may have mounting brackets 21 flexibly connected to the lifting arms, as by ball and socket joints 22. Preferably, the forward arms only are so connected while the rear arms have their outer ends free and rounded to slide upon the base of the seat during adjustment.

The strength or power of the motor and its effectiveness on the seat are designed primarily to assist the occupant in lifting his own weight to a semi-standing position from which he may brace himself with his feet. For example, the mechanism may exert a lifting force of 35 or 40 pounds, or even more, but preferably less than the weight of the occupant. The speed of action will be governed by port capacity or otherwise to exert the desired lifting effort gradually and without shock.

Preferably the motor will not complete its stroke or cycle of movement until the weight of the occupant is substantially removed from the seat, as, for instance, when he has left the seat. Thereafter, the piston 16 will complete its travel in the seat lifting direction and as it completes its stroke, a restoring means will serve to return the seat to its normal position. In accordance with the present disclosure, this restoring means embodies a snap action for the valve 20, the latter being movable over an external seat 20' through which opens the suction supply port 23 and two chamber ports 24. The suction supply port is in constant communication with the suction supply conduit 19 and is normally connected by the valve 20 to the left end of the motor chamber while the uncovered chamber port opens the right end to the atmosphere. When the valve 20 is shifted to connect the supply port to the right end of the chamber and the atmosphere to the left end the seat will be elevated. A spring 25 has its line of spring force shifted across the valve pivot and serves to hold the valve in either position. The valve may be shifted manually, as by a free flexible wire 26, to connect the right end of the chamber and at the end of the motor stroke the valve will be tripped, as by the lug 27 on the piston, which lug has a cam face 27' engageable with an arm 56 that is fixed on the inner end of the valve carrying shaft 57 to move as a unit with the valve 20. The valve mechanism may be inclosed by a cover 20'', if desired. Stops 25' determine the operative positions of the valve 20.

In the modification shown in Figs. 4 and 5, the seat has an inner section 28 hinged at 29 to a surrounding outer portion 30. The motor 31 may be arranged upright, with the piston 32 located directly beneath the adjustable section 28 and connected thereto by the vertical piston rod 33. The location of the hinge 29 and the motor 31 is such that the seat section 28 will tilt in a diagonal direction, forwardly as well as laterally, so as to secure the beneficial effect flowing from the construction shown in Figs. 1 and 2. In this embodiment the centrally located seat section 28 may be separately upholstered and cushioned, or a spring 34 may resiliently support the piston 32 in its lowered position to cooperate with the other seat springs 35 in providing the desired cushion.

In lieu of the control valve 20 any suitable valve may be used. It may be incorporated in the assist strap mounting such as is shown in Figs. 6 and 6a, wherein the assist strap or cord 36, when pulled, will depress the valve 37 against its spring 38 to establish the communication between the suction source and the motor. For this purpose, the valve may be cylindrical and formed with a reduced portion to provide the recess 37a for connecting the conduit 19a to an extension 19b thereof. This assist strap 36 is suitably attached to the valve 37, as shown in Fig. 6 wherein the valve has a lateral extension 37b for such purpose. When the cord is released the valve will interrupt the communication and vent the upper end of the chamber to the atmosphere. The lower end of the chamber may be constantly vented through an orifice 39.

In Fig. 7 the motor 31' is double acting, having suction communication through branch conduits 19' and 19'' with the opposite ends of the cylinder both above and below the piston thereof. When the assist cord 36 is pulled downwardly the valve 37' will open the suction line through the branch conduit 19'' to the upper end of the cylinder for elevating the piston, and when the assist cord is released its valve 37' will open the lower end of the cylinder through the branch conduit 19'' to the suction supply line to pull the piston down.

The same boosting effect may be accomplished somewhat to the same extent by lowering the feet of the occupant so as to permit his legs to extend at an obtuse angle for more readily supporting the weight of his body. This will also serve to rearrange the sitting posture of the seat occupant so as to give him the benefit of a forward tilt of his body in order to facilitate his rising from the seat. For accomplishing this the floor of the vehicle is provided with a well 40 in which is arranged a floor section 41 normally supported by a piston rod 42 at floor level and adapted to recede within the well when the motor chamber 43 is connected at the underside of the piston 44 to the source of suction. A control valve 45 serves to connect a suction supply line 46 selectively through the branch passages 47 and 48 to the upper and lower ends of the motor chamber and concurrently vent the unconnected end to the atmosphere.

The motor piston 44 is preferably self-locking against unauthorized recession. To this end the piston may be constructed as shown in Fig. 11, wherein the piston rod 42 has fixed thereto a piston section 49 and also has connected thereto, but by a play connection, a floating piston section 50, the play connection comprising a coupling plate 51 connected by spacing studs 52 to the floating piston section and in turn loosely connected between shoulders 53 on the piston rod. Brake shoes 54 are carried at the outer ends of toggle arms 55 radiating from and fixed to the piston rod, said arms being biased to one side so as to permit the shoes to drag lightly on the cylinder wall in one direction of movement but to spread upon rod-imparted movement in the opposite direction and thereby firmly press the shoes against the cylinder wall. Consequently, if the control valve 45 is released prior to the completion of the floor lowering movement, the floor section will be held in its semi-lowered position until the valve has again been opened to the source of suction either to complete the downstroke or to return the section. By reason of the self-locking piston the floor section will only be lowered when the suction influence is admitted to the lower side of the piston, the action being that the floating piston section 50 will, under the urge of the pressure differential, exert a pull on the coupling plate 51 and through such move the brake shoes 54 from braking contact with the cylinder wall. However, should the source of operating pressure fail the brake will act to arrest and hold the receding floor section at the present level.

This self-locking piston may be incorporated in the seat adjustment of Figs. 1, 2 and 3, if desired, by reversing the cup packings and the toggle arrangement to respond to a pull on the piston rod. Such an arrangement is shown in Fig. 12 wherein the cup packings are reversed with respect to their positions shown in Fig. 11, and likewise the toggle arms 58 are also reversed. When the pressure differential is acting on the floating piston section 59 to exert a push on the spacing studs 60, the coupling plate 61 will lift the shoes 62 out of locking contact with the wall of the chamber and thereby flex the spring toggle arms 58 in a contracting direction. Likewise when the pressure differential is acting on the fixed piston section 63 the latter will exert a pull on the piston rod 17 and a push on the central portion of the toggle arm 58 so as to cause them to assume a slightly collapsed and lock releasing position, the coupling plate 61 idling with respect to the rod 17 until the toggle arms have been disposed in such lock releasing position. Thereafter one of the shoulders 64 will engage the coupling plate and through the spacing studs 60 drive forwardly the floating piston section 59 which carries the valve camming lug 27.

Obviously when the pressure differential is not acting on either piston section the toggle arms 58 will hold the shoes in light contact with the chamber wall, which contact or engagement will be made firmer by the weight of the occupant. However, when the floating piston section is operating under a pressure differential it will act through the coupling plate 61 to initially release the lock or brake shoes before exerting a pull on the piston rod. As illustrated, the toggle acting arms 58 may be cut from a spring metal plate and dished, as shown.

In any embodiment of the invention the net result will be to assist the occupant in leaving the seat, the action tending to relate the center of gravity of the body more directly over the feet and even extending the legs to an obtuse angle. This disposition of the occupant will enable him to readily leave the car without difficulty.

While the foregoing description has been given in detail it is obvious that the inventive principles herein involved may be utilized in other physical embodiments without departing from the spirit or scope of the invention claimed.

What is claimed is:

1. A vehicle having a side entranceway, a seat member arranged transversely of the vehicle and rearwardly of the entranceway, means mounting the seat member for tilting forwardly in a diagonal direction toward the entranceway whereby to dispose the occupant not only forwardly to assist him in arising from the seat member but also laterally toward the entranceway to enable him alighting directly through the entranceway, and occupant controlled means operable for so tilting the seat member.

2. A motor vehicle having a cushioned seat arranged transversely of the vehicle and divided to provide an end section adjacent an entranceway of the vehicle, means mounting the end section for tilting forwardly in a diagonal direction toward the entranceway and away from the remaining portion of the seat, and occupant controlled power operated means connected to the seat and operable to elevate the seat to so tilt the seat diagonally toward the entranceway for assisting the occupant in leaving the seat.

3. A motor vehicle having an entranceway at each side, a seat arranged transversely of the vehicle and having plural sections one adjacent each entranceway, a back rest independent of but common to the sections, means mounting each section for tilting forwardly and away from the other section toward the entranceway and independently of the back, and occupant controlled means operable to tilt the seat sections selectively.

4. A vehicle according to claim 1, wherein the occupant controlled means comprises a fluid motor having a chamber and a piston therein, said motor operatively connected to the seat for so moving the seat to such tilted position and for lowering the seat to its normal position, manually controlled means operable by the seat to arrest the latter in its tilted position against lowering movement upon failure of the fluid power, said arresting means being rendered inoperative by and during fluid operation of the motor to so lower the seat from its tilted position, and means operable to connect the motor to a source of operating pressure.

5. A vehicle according to claim 1, wherein the occupant controlled means comprises a power operated motor operatively connected to the seat for so tilting the same, an assist pull member adjacent the seat on which the occupant may pull to assist him in leaving the seat, and means operable by the pull member for controlling the admission of fluid to the motor whereby to cooperate with the occupant's lifting effort on the pull member in lifting the occupied seat.

6. A vehicle according to claim 8 wherein said operable means comprises a fluid motor operable to so tilt the seat, and an occupant controlled valve having an assist pull member as a handle to regulate the admission of fluid pressure to the motor.

7. A vehicle according to claim 1, wherein means are provided which are responsive to the occupant load on the seat to hold the seat in its tilted position against return to a normal position upon failure of the occupant controlled means.

8. A vehicle having a side entranceway, a seat member disposed rearwardly of the entranceway, means mounting the seat member for forward movement with a lateral tilt toward the entranceway whereby to project the seat occupant forwardly and at the same time lean him toward the entranceway to facilitate his leaving the seat member, and means operable for so actuating said mounting means.

9. A vehicle having a side entranceway with a transverse seat arranged rearwardly therefrom and having a rearwardly sloping top presenting a low ceiling above the back of the seat, in combination, with means for shifting the seat forwardly and concurrently tilting the seat laterally toward the entranceway to bring the occupant of the seat adjacent the entranceway to facilitate his leaving the seat.

10. A vehicle having a side entranceway, a seat disposed rearwardly of the entranceway, means mounting the seat for tilting whereby the front portion of the seat will move forward and the rear portion of the seat will move forward and upward, a power operated motor operatively connected to the seat for so tilting the same, an assist pull member adjacent the seat on which the occupant may pull to assist him in leaving the seat, and means operable by the pull member for controlling the admission of fluid to the motor whereby to cooperate with the occupant's lifting effort on the pull member in lifting the occupied seat.

JOHN R. OISHEI.

References Cited in the file of this patent

UNITED STATES PATENTS

| Number | Name | Date |
|---|---|---|
| 342,072 | Curtis | May 18, 1886 |
| 342,073 | Curtis | May 18, 1886 |
| 1,640,984 | De Petris | Aug. 30, 1927 |
| 2,239,917 | Hunter et al. | Apr. 29, 1941 |
| 2,242,247 | Grant | May 20, 1941 |
| 2,277,357 | Saunders | Mar. 24, 1942 |
| 2,338,069 | Horton et al. | Dec. 28, 1943 |
| 2,432,895 | Horton | Dec. 16, 1947 |

FOREIGN PATENTS

| Number | Country | Date |
|---|---|---|
| 556,692 | Germany | Aug. 20, 1932 |
| 705,693 | France | Mar. 16, 1931 |